(12) United States Patent
Schori et al.

(10) Patent No.: US 8,348,243 B2
(45) Date of Patent: Jan. 8, 2013

(54) GAS METERING DEVICE FOR A HOME SODA MACHINE

(75) Inventors: Amir Schori, Pardes Hana-Carkur (IL); Alon Gendel, Raanana (IL); Allan Ring, Mercaz Shapira (IL); Antony Frank Pateman, Peterborough (GB); David O'Neill, Peterborough (GB)

(73) Assignee: Sodastream Industries Ltd., Airport (IL)

( * ) Notice: Subject to any disclaimer, the term of this patent is extended or adjusted under 35 U.S.C. 154(b) by 233 days.

(21) Appl. No.: 12/723,652

(22) Filed: Mar. 14, 2010

(65) Prior Publication Data

US 2011/0220209 A1   Sep. 15, 2011

(51) Int. Cl.
*B01F 3/04*   (2006.01)
(52) U.S. Cl. .................. 261/64.1; 261/74; 261/DIG. 7; 137/552.7
(58) Field of Classification Search .................. 261/64.1, 261/74, 121.1, DIG. 7; 137/3, 7, 15.08, 87.03, 137/552.7
See application file for complete search history.

(56) References Cited

U.S. PATENT DOCUMENTS

| | | | |
|---|---|---|---|
| 3,823,846 A | 7/1974 | Probst | |
| 4,476,894 A * | 10/1984 | Alder | 137/552.7 |
| 4,745,853 A | 5/1988 | Hoover | |
| 5,601,218 A | 2/1997 | Takenaka | |
| 5,829,470 A * | 11/1998 | Yowell et al. | 137/87.06 |
| 6,017,021 A * | 1/2000 | Yiu | 261/64.1 |
| 6,319,414 B1 | 11/2001 | Wiseburgh et al. | |
| 6,374,845 B1 * | 4/2002 | Melendez et al. | 137/3 |
| 6,533,252 B1 * | 3/2003 | Bernard et al. | 261/18.1 |
| 2006/0086136 A1 * | 4/2006 | Maritan et al. | 62/389 |
| 2006/0138170 A1 | 6/2006 | Brim et al. | |
| 2008/0071424 A1 | 3/2008 | St. Jean et al. | |

FOREIGN PATENT DOCUMENTS

| | | |
|---|---|---|
| DE | 19855170 | 5/2000 |
| DE | 10244573 | 4/2004 |
| EP | 0426266 | 5/1991 |
| GB | 498536 | 1/1939 |
| GB | 2287013 | 9/1995 |

* cited by examiner

Primary Examiner — Charles Bushey
(74) Attorney, Agent, or Firm — Daniel J. Swirsky; AlphaPatent Associates Ltd.

(57) ABSTRACT

A home soda machine includes a cylinder of gas suitable for carbonation, an attachment mechanism to attach a bottle of water, a valve opening mechanism to open a gas release valve on the gas cylinder and introduce the gas to the bottle of water, a gas release sensor to sense at least events indicating the opening and closing of the gas release valve, and an indirect gas meter to at least determine an amount of the gas released from the cylinder based at least on a cumulative length of time the gas release valve was open as per data received from the gas release sensor.

23 Claims, 2 Drawing Sheets

GAS METERING DEVICE FOR A HOME SODA MACHINE

FIELD OF THE INVENTION

The present invention relates to home soda machines generally and to gas metering for such machines in particular.

BACKGROUND OF THE INVENTION

Home soda machines for the carbonation of beverages are known in the art. FIG. 1, to which reference is now made, illustrates a simplified view of a typical such home soda machine 100. Home soda machine 100 may comprise a gas release lever 10, a bottle attachment mechanism 20, a pressurized cylinder 30, release valve 40 and water bottle 50.

Gas release lever 10 controls the state of release valve 40. When lever 10 is pressed in the direction of arrow 15, release valve 40 opens to enable the flow of gas from cylinder 30 via gas tube 45 to mechanism 20. Releasing lever 10 returns it to its previous position and valve 40 closes.

Water bottle 50 is typically filled with water and affixed to mechanism 20. When gas release lever 10 is pressed down against release valve 40 $CO_2$ gas from pressurized cylinder 30 is introduced into the water in water bottle 50 through bottle attachment mechanism 20. This procedure is typically repeated until a desired level of carbonation is reached. When soda preparation is finished, bottle attachment mechanism 20 is tilted to allow pressure to be released and to enable bottle 50 to be detached.

Such soda machines 100 are not typically equipped with means to inform a user regarding the amount of $CO_2$ remaining in cylinder 30. Adding a gas meter capable of accurately measuring the levels inside cylinder 30 would significantly increase the cost and complexity of machines 100. Accordingly, users of machines 100 typically have no advance warning before cylinders 30 run out of $CO_2$.

SUMMARY OF THE INVENTION

There is provided, in accordance with an embodiment of the invention, a home soda machine including a cylinder of gas suitable for carbonation, an attachment mechanism to attach a bottle of water, a valve opening mechanism to open a gas release valve on the gas cylinder and introduce the gas to the bottle of water, a gas release sensor to sense at least events indicating the opening and closing of the gas release valve, and an indirect gas meter to at least determine an amount of the gas released from the cylinder based at least on a cumulative length of time the gas release valve was open as per data received from the gas release sensor.

Further, in accordance with an embodiment of the invention, the home soda machine also includes a tilt sensor to sense at least events indicating replacement of the bottle of water.

Still further, in accordance with an embodiment of the invention, the tilt sensor is at least one of an SPST-type mechanical switch, a reed switch sensing a presence/absence of a magnet attached to another element of the home soda machine, and a slotted optical sensor.

Additionally, in accordance with an embodiment of the invention, the gas release sensor is at least one of an SPST-type mechanical switch, a reed switch sensing a presence/absence of a magnet attached to another element of the home soda machine, a slotted optical sensor, a microphone to detect sounds of gas moving through the gas release valve, an integrated gas flow meter, and a pressure sensor.

Moreover, in accordance with an embodiment of the invention, the home soda machine also includes a cylinder sensor to sense at least events indicating replacement of the cylinder of gas, where the cylinder sensor is at least one of a mechanical switch, a capacitive sensor, an inductive proximity sensor, and a reflective optical sensor.

Further, in accordance with an embodiment of the invention, the cylinder of gas contains $CO_2$.

Still further, in accordance with an embodiment of the invention, the indirect gas meter includes a pushbutton to facilitate user input, where the pushbutton.

Additionally, in accordance with an embodiment of the invention, the indirect gas meter includes a central processing unit to calculate the amount of gas released based on at least the cumulative length of time and expected release rates for the cylinder of gas.

Moreover, in accordance with an embodiment of the invention, the indirect gas meter also includes means to estimate a level of carbonation in the water bottle based on at least the cumulative length of time and expected release rates for the cylinder of gas.

Further, in accordance with an embodiment of the invention, the indirect gas meter includes a timer to facilitate calculating the cumulative length of time.

Still further, in accordance with an embodiment of the invention, the indirect gas meter includes at least one of an audio unit and a display unit to provide feedback to a user, where the audio unit is at least one of a speaker or piezoelectric buzzer.

Additionally, in accordance with an embodiment of the invention, the feedback includes at least one of warnings to replace the cylinder of gas, and an indication of a level of carbonation in the water bottle.

Moreover, in accordance with an embodiment of the invention, the indirect gas meter includes a weighted average calculator to calculate predicted lengths of time required to empty the cylinder of gas based on a weighted average of actual the lengths of time observed for previously used the cylinders of gas.

Further, in accordance with an embodiment of the invention, the weighted average calculator includes means for storing at least a history of actual usage times for the cylinder of gas, where each of the actual usage times represent a cumulative time the cylinder of gas was activated to release gas before being replaced.

Still further, in accordance with an embodiment of the invention, the means for storing are configurable to store multiple instances of the at least a history to represent the actual usage times for a multiplicity of different sized the cylinders of gas.

There is also provided, in accordance with an embodiment of the invention, a method implemented on a home soda machine to indirectly meter contents of a cylinder of gas, the method including receiving indications that a gas release valve associated with the cylinder of gas is opening and closing, timing intervals between each the opening and associated closing, computing a total cumulative time between the intervals, and comparing the total cumulative time with an expected usage time for the cylinder of gas to calculate a remaining amount of gas in the cylinder of gas.

Further, in accordance with an embodiment of the invention, the method also includes alerting a user regarding an anticipated need to replace the cylinder of gas when the remaining amount is below a threshold level.

Still further, in accordance with an embodiment of the invention, the alerting is performed via at least one of an audio unit and a display unit.

Additionally, in accordance with an embodiment of the invention, the expected usage time is calculated as a weighted average of a series of recently computed the total cumulative times for other cylinders of gas.

Moreover, in accordance with an embodiment of the invention, the method also includes storing separate histories of the total cumulative times for different sizes of the cylinders of gas.

Further, in accordance with an embodiment of the invention, the method also includes configuring a pushbutton to indicate a change in size when replacing the cylinder of gas.

Still further, in accordance with an embodiment of the invention, the method also includes sensing replacement of a water bottle attached to the home soda machine, where contents of the water bottle are carbonated by gas released from the cylinder of gas.

Additionally, in accordance with an embodiment of the invention, the method also includes calculating a total cumulative time between the intervals for a current the water bottle, and estimating a level of carbonation for the current water bottle based on the calculating.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
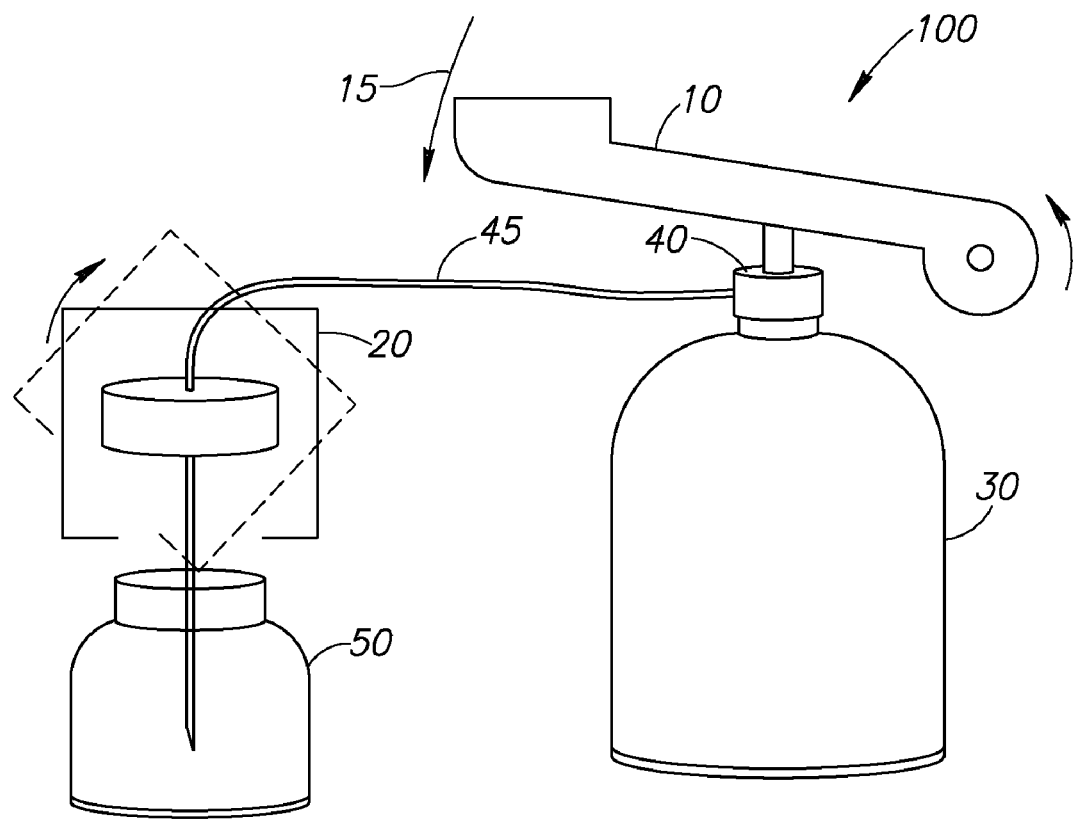
FIG. 1 is a schematic illustration of a prior art home soda machine.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the invention may be practiced without these specific details. In other instances, well-known methods, procedures, and components have not been described in detail so as not to obscure the invention.

Applicants have realized that typical users of home soda machines 100 may not require the level of accuracy provided by prior art gas metering mechanisms. Instead, indirect methods of measuring the gas inside of cylinders 30 may be employed to significantly reduce the cost while still providing generally accurate measurements to a user.

Figure 2:
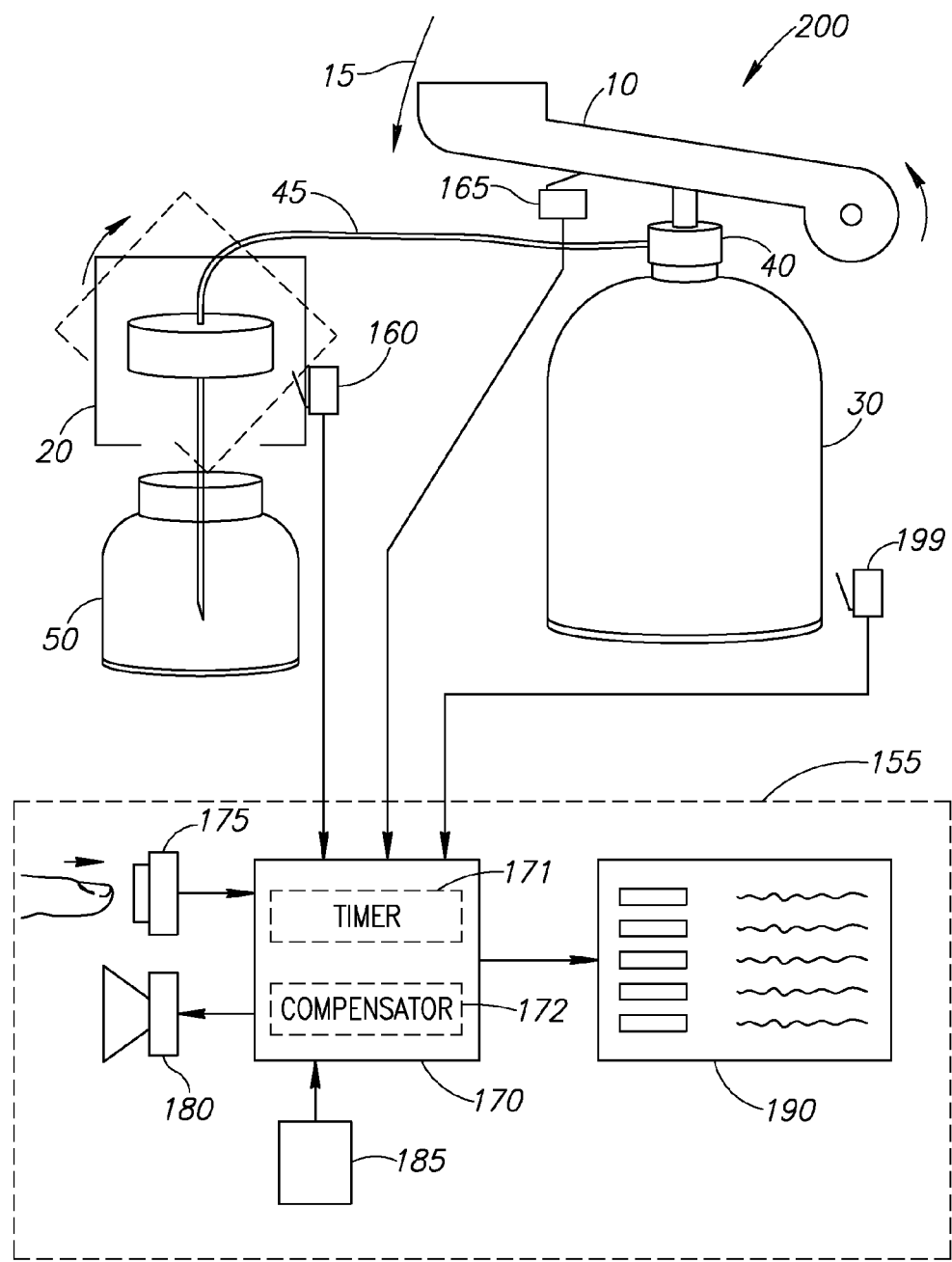
FIG. 2 is a schematic illustration of a novel home soda machine with an indirect gas meter, constructed and operative in accordance with an embodiment of the invention.

FIG. 2, to which reference is now made, illustrates a novel indirectly metered home soda machine 200 constructed and operative in accordance with an embodiment of the invention. Home soda machine 200 may comprise generally the same elements as in the prior art. Machine 200 may also comprise an indirect metering device 155 which may receive input from tilt sensor 160 and lever sensor 165 via wires 161 and 166 respectively.

Tilt sensor 160 may be a sensing device that may be installed in such a manner as to sense the tilting of the bottle attachment mechanism 20. It will be appreciated that inserting or releasing water bottle 50 may require that mechanism 20 be tilted, such that tilt sensor 160 may provide an accurate indication of a replacement of water bottle 50. Sensor 160 may be any suitable device, such as, for example, a simple SPST-type mechanical switch, a reed switch sensing the presence or absence of a magnet attached to another element of machine 200, or a slotted optical sensor.

Lever sensor 165 may be a similar device that may be positioned to detect downward movement of gas release lever 10. It will be appreciated that in such manner sensor 165 may provide an accurate indication of when gas may be released from cylinder 30. As with sensor 160, Sensor 165 may be any suitable device, such as, for example, a simple SPST-type mechanical switch, a reed switch sensing the presence or absence of a magnet attached to another element of machine 200, or a slotted optical sensor.

Indirect metering device 155 may comprise a central processor unit 170, a pushbutton 175, an audio unit 180, a battery 185, and a display unit 190. Central processor unit 170 may be any suitable device, such as a microprocessor, capable of processing the instructions necessary for the implementation of the invention. It may receive information from sensors 160 and 165 via wires 161 and 166 regarding user actions such as, for example, activation of gas release lever 10 and the insertion/removal of water bottle 50.

Central processor unit 170 may also comprise a timer unit 171 that may comprise clock functionality required for the calculation of elapsed time. As unit 170 may receive indications from sensor 165, timer unit 171 may calculate the accumulated time that lever 10 may have been engaged, thereby providing an indication regarding the cumulative amount of $CO_2$ gas that may have already been released from cylinder 30. It will be appreciated that the amount of $CO_2$ gas in a new, pre-filled cylinder 30 may be known in advance, as well as the typical flow rate of $CO_2$ gas through to bottle 50. Thus, the remaining quantity of $CO_2$ gas in cylinder 30 may be calculated with a relatively high degree of accuracy. Similarly, the amount of $CO_2$ introduced into a current water bottle 50 since it was inserted into machine 200 (as indicated by a signal from sensor 160) may also be calculated with a relatively high degree of accuracy.

It will be appreciated that these two calculations may provide information of benefit to the user of machine 200. Calculating the remaining $CO_2$ gas in cylinder 30 may enable the user to procure a replacement before the current cylinder 30 totally empties. And by measuring the flow of $CO_2$ gas into water bottle 50, it may be possible to provide a representation of the level of carbonation in the current water bottle 50.

This information may be conveyed to the user using display unit 190, in a graphical and/or textual manner, such that various levels such as 'low', 'medium', and 'high' may be used to indicate the $CO_2$ level in cylinder 30 and/or the level of carbonation in water bottle 30. In accordance with an embodiment of the invention, other visual displays may be presented on display unit 190, such as, for example, an indication of the carbonation level of the currently prepared bottle 50, both while it is being prepared and afterwards; a visual representation of the level of $CO_2$ gas remaining in cylinder 30, which may also include a specific 'cylinder near empty' indication triggered by a specific pre-determined low threshold; and/or a visual indication of the amount of $CO_2$ emissions saved, which may be derived by calculating the difference between the carbon footprint of the total amount of soda bottles prepared by the particular soda machine (as counted by processor unit 170) and the pre-calculated total carbon footprint of an identical number of soda bottles purchased as a pre-bottled, commercial soft drink (off the shelf).

In accordance with an alternative embodiment of the invention, audio unit 180 may be used in conjunction with, instead of, or in addition to, unit 190 as a means for conveying such information to the user. Audio unit 180 may be any suitable means for providing audio signals to a user, such as, for example, a speaker or piezoelectric buzzer. Accordingly, for example, unit 170 may instruct audio unit 180 to emit an audible alarm when the $CO_2$ level in cylinder 30 may be determined to be lower than a defined threshold.

In accordance with another embodiment of the invention, device 155 may be configured to check for the need to emit audible alarms when triggered by specific events. For example, when the removal or the insertion of a water bottle is sensed by sensor 160, processor unit 170 may check the $CO_2$ level in cylinder 30 and instruct audio unit 180 to emit an audible alarm if the level is below the warning threshold.

In accordance with another embodiment of the invention, device 155 may be configured to use different audible alarms to indicate different states. For example, when enough $CO_2$ remains in cylinder 30 to carbonate two water bottles 50, audio unit 180 may emit three audio alarms in rapid succession. When there may only be enough $CO_2$ to carbonate one water bottle 50, audio unit 180 may emit two alarms in rapid succession. When there may be no $CO_2$ left in cylinder 30, audio unit 180 may emit one long alarm. It will be appreciated that this is just one possible configuration; the invention may include any suitable configuration.

In order to calculate $CO_2$ levels for a current cylinder 30, indirect metering device 155 may require input as to when cylinder 30 may have been most recently replaced. In accordance with an embodiment of the invention, the user may use pushbutton 175 as per instructions that may be displayed on display unit 190 to "manually" indicate when cylinder 30 may have been replaced. In accordance with an alternative embodiment of the invention, an optional cylinder removal sensor 199 may be employed to detect a $CO_2$ cylinder removal or insertion. Cylinder removal sensor 199 may be any suitable sensing device, such as, for example, a switch, or a capacitive or other proximity sensor.

Measuring current levels $CO_2$ in cylinders 30 and/or water bottles 50 as a function of the time that gas release valve 40 is open may provide suitably accurate estimates to a user regarding the level of carbonation in water bottle 50 and/or the remaining level of $CO_2$ in cylinder 30. However, the accuracy of such measurements may still be affected by a number of variable factors. For example, there may be: uneven $CO_2$ release rates in the beginning and/or the end of the push and release action of lever 10, variation among styles and strengths of pushing the lever 10 by different users, and/or variation in tolerances of parts size and location among different batches of machine assemblies. Any one or a combination of two or more of these factors may impact on the calculation of $CO_2$ levels as a function of time alone.

Therefore, in accordance with another embodiment of the invention, processing unit 170 may also comprise a weighted average calculator 172 which may employ a learning process to compensate for possible variations in actual $CO_2$ gas release rates. Calculator 172 may record and save the total amount of time that $CO_2$ was released from successive $CO_2$ cylinders 30 before they were replaced by the user. It may then use a simple weighted average of $CO_2$ release times for the most recently used cylinders in order to calculate an expected amount of $CO_2$ release time for the next $CO_2$ cylinder 30. Central processing unit 170 may then use the most recent weighted average when calculating $CO_2$ amounts in water bottle 50 and cylinder 30.

For example, the $CO_2$ gas in a factory standard $CO_2$ cylinder may be expected to be released in 100 seconds. However, on a particular machine 200 it may actually take 104-106 seconds to empty a standard cylinder 30. Calculator 172 may record the actual replacement points (in terms of seconds of gas released) of the last five cylinders, and may calculate an expected capacity for a next cylinder as a simple arithmetic average of the last five said replacement times, together with the factory standard value of 100 seconds.

Thus, if $T_n$ may represent the next cylinder's expected capacity, and $t_n$ may represent the latest readings' arithmetic average, the following may be an exemplary process flow for the calculation of the weighted average:

The input representing the insertion of the first cylinder 30 may represent the factory standard value: $t_1=(100)/1$; thus $T_1=100$ seconds.

In actual practice, the first cylinder 30 may be replaced after a total release time of 106 seconds, accordingly: $t_2=(100+106)/2$; thus $T_2=103$ seconds.

The next cylinder 30 may be replaced after a total release time of 105 seconds, accordingly: $t_3=(100+106+105)/3$; thus $T_3=103$ seconds (rounded).

The next cylinder 30 may also be replaced after a total release time of 105 seconds, accordingly: $t_4=(100+106+105+105)/4$; thus $T_4=104$ seconds (rounded).

The next cylinder 30 may be replaced after a total release time of 104 seconds, accordingly: $t_5=(100+106+105+105+104)/5$; thus $T_5=104$ seconds (rounded).

The next cylinder 30 may be replaced after a total release time of 105 seconds, accordingly: $t_6=(100+106+105+105+104+105)/6$; thus $T_6=104$ seconds (rounded).

It will be appreciated that the error as may be represented by the difference "d" between the weighted average and the actual amount of gas remaining in the cylinder may decrease as time progresses. The first cylinder 30 may have been replaced at a difference: $d_1=rt_1-T_1=106-100=6$. The next cylinder 30 may have been replaced at a difference $d_2=rt_2-T_2=105-103=2$. Similarly: $d_3=105-103=2$; $d_4=104-104=0$; and $d_5=105-104=1$.

The difference sequence in the example may be represented as a diminishing sequence of 6, 2, 2, 0, 1 . . . , which may presumably stabilize around an error of 0-1 seconds, assuming that operating conditions may remain constant. In contrast, a difference sequence using a constant value of 100 seconds (as per the factory standard expectation) may have been as follows: 6, 5, 5, 4, 5 . . . and may have presumably not have improved over time, assuming that operating conditions may remain constant. Accordingly, it will be appreciated that the accuracy of $CO_2$ level warning indications may be increased by calculator 172.

It will also be appreciated that the factory standard expectation of 100 seconds and the actual times for emptying cylinders 30 may be exemplary. In actual operation the times may differ. Furthermore, the weighted average may be configured to use different numbers of observations in its computations of weighted average. However, it will be appreciated that regardless of the configuration, using a weighted average instead of a factory standard for the expected level of $Co_2$ in cylinder 30 may provide a more accurate representation to the user.

It will be appreciated that weighted average calculator 172 may provide self adjusting functionality to indirect gas meter 155, enabling it to learn and adjust itself according to its actual usage pattern and specific operating conditions, which may generally be unknown at the time of manufacture.

Accordingly, the alerts and readings conveyed to the user of indirect gas meter 155 may become increasingly accurate as time goes by, and the overall performance and usability of home soda machine 200 may be significantly improved.

It will be appreciated that the embodiments disclosed hereinabove may represent exemplary configurations of home soda machine 200; the invention may also include other configurations for the implementation of indirect gas meter 155 in home soda machine 200. For example, the functionality of lever sensor 165 to detect the release of $CO_2$ from gas cylinder 30 may be implemented in a variety of ways, including: a mechanical switch, a magnetic reed switch, a magnet attached to lever 10, a microphone to detect the sounds of gas moving through valve 40, a gas flow meter integrated into valve 40 and/or mechanism 20, a pressure sensor integrated into valve 40 or mechanism 20, a capacitive or other type of a proximity switch, and/or any combination of the above.

Similarly, the invention may include a variety configurations for sensing the removal of cylinder 30, such as, for example, a mechanical switch such as depicted as cylinder removal sensor 199, a capacitive or inductive proximity sensor, a reflective optical sensor, detecting significant changes in the volume/pressure of gas flow when lever 10 may be activated—a sudden increase in flow, pressure or volume compared to a previous operation may signify a new, full cylinder is present, and/or any combination of the above.

Timer 171 and calculator 172 may be implemented differently as per specific design requirements. For example, one or both may be implemented as separate modules external to processor 170.

In accordance with an embodiment of the invention, home soda machine 200 may be configured to accept gas cylinders 30 of varying sizes. Therefore in accordance with an embodiment of the invention, weighted average calculator 172 may calculate weighted averages for a multiplicity of cylinder sizes. Processor 170 may comprise means for storing recent data for two or more types of gas cylinder 50.

The user may indicate that a replacement gas cylinder 30 may be of a different size by pressing pushbutton 175. For example, pressing pushbutton 175 for ten seconds or longer may indicate that the value for the current size may be toggled or advanced a size, depending on how many different sized gas cylinders 30 may be usable with machine 200. Processor 170 may then show the current selected size on display unit 190. Alternatively, pushbutton 175 may be used in conjunction with display unit 190 to select a current size from a menu.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.)

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A home soda machine comprising:
  a cylinder of gas suitable for carbonation;
  an attachment mechanism to attach a bottle of water;
  a valve opening mechanism to open a gas release valve on said gas cylinder and introduce said gas to said bottle of water;
  a gas release sensor to sense at least events indicating the opening and closing of said gas release valve; and
  an indirect gas meter to at least determine an amount of said gas released from said cylinder based at least on a cumulative length of time said gas release valve was open as per data received from said gas release sensor.

2. The home soda machine according to claim 1 and also comprising a tilt sensor to sense at least events indicating replacement of said bottle of water.

3. The home soda machine according to claim 2 and wherein said tilt sensor is at least one of: an SPST-type mechanical switch, a reed switch sensing a presence/absence of a magnet attached to another element of said home soda machine, and a slotted optical sensor.

4. The home soda machine according to claim 1 and wherein said gas release sensor is at least one of: an SPST-type mechanical switch, a reed switch sensing a presence/absence of a magnet attached to another element of said home soda machine, a slotted optical sensor, a microphone to detect sounds of gas moving through said gas release valve, an integrated gas flow meter, and a pressure sensor.

5. The home soda machine according to claim 1 and also comprising a cylinder sensor to sense at least events indicating replacement of said cylinder of gas, wherein said cylinder sensor is at least one of a mechanical switch, a capacitive sensor, an inductive proximity sensor, and a reflective optical sensor.

6. The home soda machine according to claim 1 and wherein said cylinder of gas contains $CO_2$.

7. The home soda machine according to claim 1 and wherein said indirect gas meter comprises a pushbutton to facilitate user input.

8. The home soda machine according to claim 1 and wherein said indirect gas meter comprises a central processing unit to calculate said amount of gas released based on at least said cumulative length of time and expected release rates for said cylinder of gas.

9. The home soda machine according to claim 8 and wherein said indirect gas meter also comprises means to estimate a level of carbonation in said water bottle based on at least said cumulative length of time and expected release rates for said cylinder of gas.

10. The home soda machine according to claim 1 and wherein said indirect gas meter comprises a timer to facilitate calculating said cumulative length of time.

11. The home soda machine according to claim 1 and wherein said indirect gas meter comprises at least one of an audio unit and a display unit to provide feedback to a user, wherein said audio unit is at least one of a speaker or piezoelectric buzzer.

12. The home soda machine according to claim 11 and also wherein said feedback comprises at least one of: warnings to replace said cylinder of gas, and an indication of a level of carbonation in said water bottle.

13. The home soda machine according to claim 1 and wherein said indirect gas meter comprises a weighted average calculator to calculate predicted lengths of time required to empty said cylinder of gas based on a weighted average of actual said lengths of time observed for previously used said cylinders of gas.

14. The home soda machine according to claim 13 and wherein said weighted average calculator comprises means for storing at least a history of actual usage times for said cylinder of gas, wherein each of said actual usage times represent a cumulative time said cylinder of gas was activated to release gas before being replaced.

15. The home soda machine according to claim 14 and wherein said means for storing are configurable to store multiple instances of said at least a history to represent said actual usage times for a multiplicity of different sized said cylinders of gas.

16. A method for indirectly metering contents of a cylinder of gas, the method implemented on a home soda machine according to claim 1, the method comprising:
receiving indications that a gas release valve associated with said cylinder of gas is opening and closing;
timing intervals between each said opening and associated closing;
computing a total cumulative time between said intervals; and
comparing said total cumulative time with an expected usage time for said cylinder of gas to calculate a remaining amount of gas in said cylinder of gas.

17. The method according to claim 16 and also comprising alerting a user regarding an anticipated need to replace said cylinder of gas when said remaining amount is below a threshold level.

18. The method according to claim 17 and wherein said alerting is performed via at least one of an audio unit and a display unit.

19. The method according to claim 16 and wherein said expected usage time is calculated as a weighted average of a series of recently computed said total cumulative times for other said cylinders of gas.

20. The method according to claim 19 and also comprising storing separate histories of said total cumulative times for different sizes of said cylinders of gas.

21. The method according to claim 19 and also comprising configuring a pushbutton to indicate a change in size when replacing said cylinder of gas.

22. The method according to claim 16 and also comprising sensing replacement of a water bottle attached to said home soda machine, wherein contents of said water bottle are carbonated by gas released from said cylinder of gas.

23. The method according to claim 22 and also comprising:
calculating a total cumulative time between said intervals for a current said water bottle; and
estimating a level of carbonation for said current water bottle based on said calculating.

* * * * *